United States Patent
Brennan, Jr. et al.

(10) Patent No.: US 8,736,460 B2
(45) Date of Patent: May 27, 2014

(54) TIME DIVERSIFIED PACKET PROTOCOL

(75) Inventors: William J. Brennan, Jr., Montgomery, AL (US); Joseph Quentin Easterling, Tallassee, AL (US)

(73) Assignee: Neptune Technology Group, Inc., Tallassee, AL (US)

( * ) Notice: Subject to any disclaimer, the term of this patent is extended or adjusted under 35 U.S.C. 154(b) by 0 days.

(21) Appl. No.: 13/438,545

(22) Filed: Apr. 3, 2012

(65) Prior Publication Data

US 2013/0257630 A1    Oct. 3, 2013

(51) Int. Cl.
*G08B 23/00*    (2006.01)

(52) U.S. Cl.
USPC .......... 340/870.02; 379/106.03; 379/106.06; 702/62

(58) Field of Classification Search
USPC .......... 340/870.02, 870.03, 870.11, 870.01, 340/870.29; 379/106.03, 106.04, 106.06, 379/106.07, 106.08, 106.09; 702/62
See application file for complete search history.

(56) References Cited

U.S. PATENT DOCUMENTS

| | | | | |
|---|---|---|---|---|
| 7,343,255 B2* | 3/2008 | Osterloh et al. | ............... | 702/62 |
| 2006/0224335 A1* | 10/2006 | Borleske et al. | ............... | 702/62 |
| 2006/0244631 A1* | 11/2006 | Zigdon et al. | ............ | 340/870.11 |

* cited by examiner

*Primary Examiner* — Nabil Syed
*Assistant Examiner* — Laura Nguyen
(74) *Attorney, Agent, or Firm* — Paul M. Sykes; Nicholas J. Landau; Bradley Arant Boult Cummings LLP

(57) ABSTRACT

A method of reporting information from a meter interface unit to a receiving device in which a data packet is transferred from the meter interface unit containing meter readings, which are associated with an indicator of the elapsed time since the reading was taken. The receiving device compares this elapsed time value with the actual elapsed time, based upon the internal clock of the receiving device, in order to determine any inaccuracies in the clock of the meter interface unit. In another embodiment, the data packet includes at least two nonsequential meter readings, separated by a multiplicity of reading intervals, on a rolling basis, such that data will not be lost as a result of a temporary obstruction that interferes with the transmission or receipt of meter readings.

13 Claims, 2 Drawing Sheets

| | | | | | | | |
|---|---|---|---|---|---|---|---|
| $T_0$ | Header | $ET_0$ | $R_0$ | -- | -- | ... | End |
| $T_1$ | Header | $ET_1$ | $R_1$ | -- | -- | ... | End |
| . | | | | | | | |
| . | | | | | | | |
| $T_{12}$ | Header | $ET_0$ | $R_{12}$ | $R_0$ | -- | ... | End |
| $T_{13}$ | Header | $ET_1$ | $R_{13}$ | $R_1$ | -- | ... | End |
| . | | | | | | | |
| . | | | | | | | |
| $T_{24}$ | Header | $ET_0$ | $R_{24}$ | $R_{12}$ | $R_0$ | ... | End |
| $T_{25}$ | Header | $ET_1$ | $R_{25}$ | $R_{13}$ | $R_1$ | ... | End |
| . | | | | | | | |
| . | | | | | | | |
| $T_{36}$ | Header | $ET_{12}$ | $R_{36}$ | $R_{24}$ | $R_{12}$ | ... | End |
| $T_{37}$ | Header | $ET_{13}$ | $R_{37}$ | $R_{25}$ | $R_{13}$ | ... | End |

US 8,736,460 B2

TIME DIVERSIFIED PACKET PROTOCOL

TECHNICAL FIELD

The invention relates generally to the field of automated meter reading systems, such as for water, gas, electricity, or chemicals.

BACKGROUND

Utilities and other entities operate distribution systems for water, gas, and electricity to deliver these resources to various consumers connected to the distribution system, with a meter at each point the resource is removed from system to measure the consumer's usage. Many metering systems utilize wireless communications modules operatively connected to the meter itself (which may be referred to as endpoints, nodes, or the like, and which hereinafter will be referred to generically as a meter interface unit, or MIU), such that the MIU reports the meter reading electronically to a communications network. The network may include a mobile communications device that collects the transmitted readings as a utility worker drives within range of the meters, or stationary receivers or collectors designed to receive messages from a designated set of meters within a certain range. Various network topologies and technologies exist in the prior art for transmitting meter readings from an MIU at the meter either through an intermediary device (whether stationary or mobile, including MIU's acting as an intermediary device in a mesh network) and on to a central data collection or processing unit. In this disclosure, the term "collector" shall refer to any device that receives transmissions of meter readings from an MIU in an automated meter reading (AMR) system, in any network architecture or topology. In AMR systems, the communications module at the meter might transmit a reading on a predetermined interval (a "bubble up" system), or the module might respond to a command to report a meter reading from the central host or a nearby receiver or collector. The details of such networks are known and understood by those of ordinary skill in the art and will not be discussed in further detail here. In any case, such communication systems offer the ability for rapid transmission of meter readings from the meter itself back to the central host computer for compilation and analysis.

Typically, an MIU transmits a data packet containing one or more meter readings on pseudorandom intervals. The data packet typically contains the most recent reading or readings, which roll off the packet based on age as more recent readings become available. For example, assume a packet contains data fields for three readings, and readings are taken every fifteen minutes, but transmitted every five minutes. A given set of three readings (the most recent reading, the reading taken fifteen minutes before the most recent reading, and the reading taken thirty minutes before the most recent reading) is therefore transmitted three times before a new reading is taken and the oldest reading is dropped from the packet to make room for the new reading. In this scenario, each reading is transmitted three times before being put in a new position and nine times before being replaced by a newer reading.

Data can be lost, however, if there is some problem preventing a successful transmission or receipt of the reading before the reading completes its progression through the available data fields in the packet as newer readings are made. These problems include, for example, weather conditions, environmental conditions, an outage in the receiving network, or other interference. Water meters in particular are often contained in pits, below ground level, as are the MIUs. If there is heavy rainfall, the pit may fill with water, which interferes with the transmission capabilities of the antenna. Similarly, a delivery driver or other person may park a vehicle immediately over or next to the meter location, which could block transmission of the meter readings. While these weather, environmental, or network conditions are temporary, if they were to last more than an hour in the example above, meter readings would be lost.

As referenced above, MIUs (especially those in water, gas, or chemical systems) often operate on batteries, which are intended to last for many years. MIUs also are programmed to take certain actions, such as readings and transmissions, upon certain time intervals, and it may be important to know exactly when a reading was made. MIUs therefore contain clock or timing circuits. While accurate timing is desirable, a highly precise clock that does not drift over the intended life of the MIU is relatively expensive and may consume more power than a less expensive clock. Given that there are often very large numbers of MIUs in a distribution system (tens of thousands), the incremental cost of a highly precise clock is multiplied by the large volume of units required. Apart from considerations of cost and power consumption, the clocks in MIUs may drift or lose accuracy because of the wide temperature ranges to which they are exposed, humidity levels, and aging of components. Preventing such drift could require regular testing and maintenance of the MIUs or better components, both of which add costs to operation of the system. On the other hand, there typically are far fewer collectors than MIUs, because hundreds or even thousands of MIUs may be served by a single collector. Collectors are usually connected to a fixed power source. Because they are substantially fewer in number, collectors are more readily maintained and upgraded than MIUs. It would be advantageous to shift the cost, power, and maintenance requirements of a highly precise clock from the MIU to the collector.

Thus, there exists a need for an AMR system in which the time that meter readings were made can be determined accurately without incurring the full cost of a highly precise clock in the MIU. There also exists a need for an AMR system in which meter readings will not be lost because of temporary obstructions that interfere with the transmission or receipt of meter readings.

SUMMARY

Embodiments of the present invention satisfy these needs. One embodiment comprises a method reporting information from a meter in an automated meter reading system, in which a collector or other device receiving data from a meter interface unit (MIU) in communication with the meter receives a packet of data from the MIU containing at least one meter reading, in which the reading is associated with an indicator reporting the time elapsed since the reading was taken, based on a clock of said MIU. Each reading in the packet is associated with the actual time the reading was taken, based upon a clock of the receiving device and the elapsed time indicator. These steps are repeated with a later packet that contains at least one of the same readings as the first packet, where the elapsed time indicator of this same reading in the later packet is different than the elapsed time indicator of this same reading in the first packet. Then, the actual time elapsed between the same readings, based upon the clock of said receiving device, is compared with the reported time elapsed between the same reading, based upon said elapsed time indicators in order to determine inaccuracies in the time keeping functions or clock of the MIU. Inaccuracies in the MIU clock that exceed a predetermined threshold can be reported to a central computing station or data center. In addition, in an AMR system using two-way communication, a command may be sent to the MIU to reset its clock to the correct value, or a calibration factor may be sent to the MIU for the MIU to improve the accuracy of its timekeeping functions. In one embodiment, the clock of the receiving device may set in accordance with data from the global positioning system.

Another embodiment of the present invention comprises a method of reporting information from a meter in an automated meter reading system, in which the meter is read upon reading intervals and each reading is associated with a time stamp corresponding to when the reading was made. A packet comprising a plurality of readings and an indicator of time elapsed since each said reading was taken is transmitted to a collector or other device, wherein at least two of the readings in the packet are nonsequential and the elapsed time between them exceeds a multiplicity of reading intervals. In one embodiment, the packets are transmitted on a transmit interval, which may be pseudorandom, and there is at least one transmit interval in each reading interval. Alternatively, there may be at least one reading interval in each transmit interval. In one embodiment, the time stamp corresponds to an actual time of day and the elapsed time indicator is the time stamp. In another embodiment, the elapsed time indicator is the difference between the time of transmission of the packet and the time stamp. The time stamp can be a serialized time value that does not necessarily correspond to an actual time of day. Each reading in the packet may be associated with the actual time of day corresponding said indicator by a device receiving said transmission. In an embodiment where the reading intervals are fixed, the time stamp may correspond to a particular reading interval. In a preferred embodiment, the packet includes at least three meter readings, which include the two most recent sequential readings from which the most recent flow rate can be determined.

BRIEF DESCRIPTION OF THE DRAWINGS

The present invention will be explained, by way of example only, with reference to certain embodiments and the attached figures, in which.

DETAILED DESCRIPTION

Embodiments of the present invention provide methods of reporting information gathered by an MIU on selected intervals from a metering device in such a way that the information is not lost even if the transmission or reception of information from the MIU is compromised for many such intervals. Embodiments of the present invention also comprise methods of providing temporally accurate information regarding readings even where the clock in the MIU is subject to inaccuracies and drift.

Figure 1:
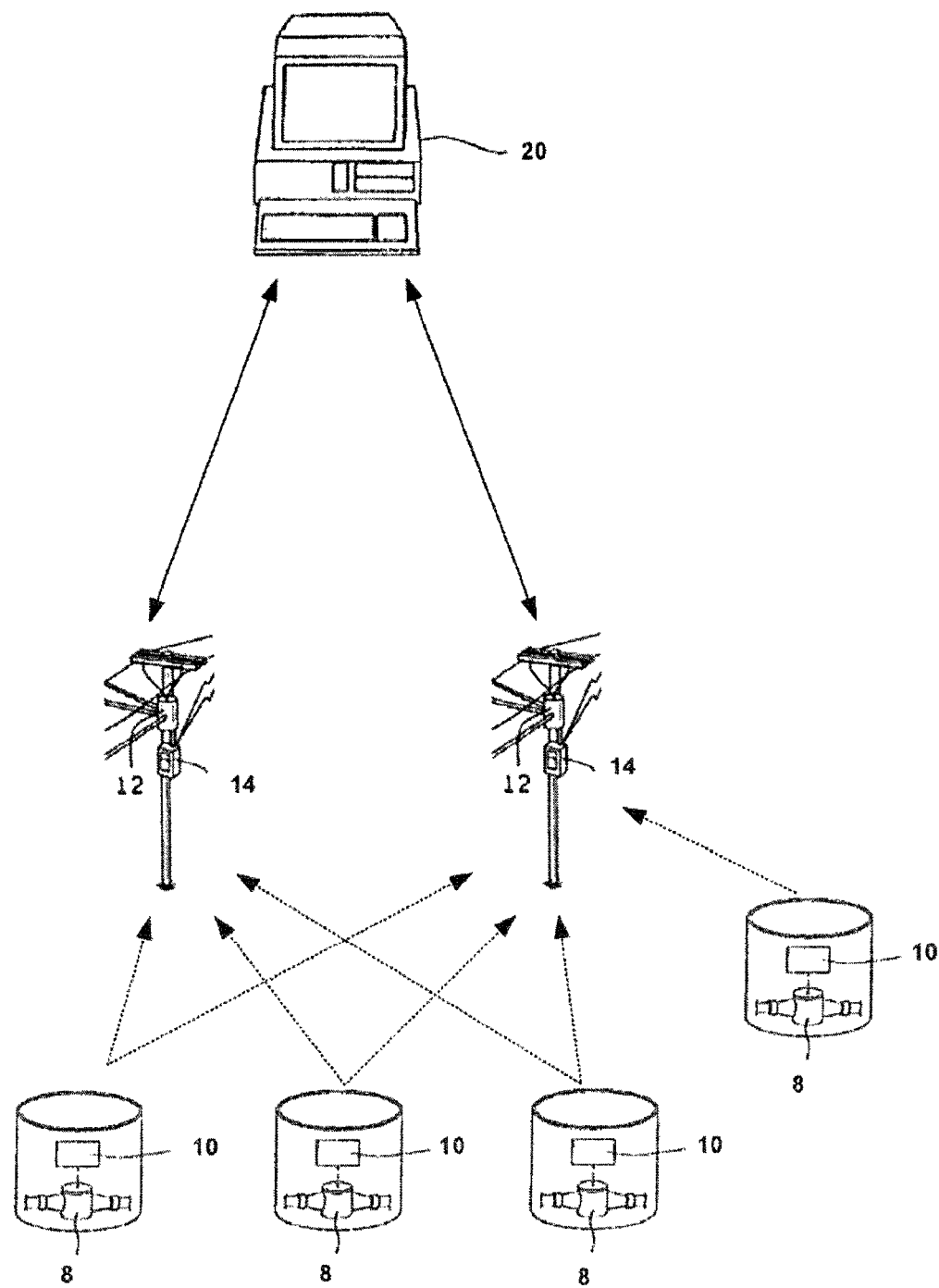
FIG. 1 is a schematic of an exemplary automatic meter reading system.

FIG. 1 is a schematic of an exemplary automatic meter reading (AMR) system. The system shown in FIG. 1 is a three-tiered, hierarchical network topology and is exemplary only; the methods of the present invention can be used with any AMR network topology, architecture, or communications scheme. As shown in FIG. 1, MIU's 10 are in operative communication with meters 8. The meters 8 illustrated in FIG. 1 are water meters, although they also could be meters to measure electrical, gas, chemical, or other resource usage. The MIUs 10, which typically are battery powered, communicate with collectors 14 (which could be any type of receiving device, including another MIU in a mesh network architecture) that is typically mounted upon utility pole 12. The collectors 14 preferably have a line power source. The collectors 14 communicate through a network, wired or wirelessly, which may be a proprietary network or the internet, by technology well known in the art, to a server or central data station 20, which aggregates and processes the data received in the communications from the collectors 14.

In one embodiment, an MIU is programmed to make and store meter readings on a predetermined reading interval. As used herein, the term "reading" may refer to an actual reading of the meter value, or a number derived from the meter value, such as consumption, or a percentage of consumption over a particular interval. Thus "reading" should be understood to mean a direct reading, a consumption, or any value derived from resource usage measured by the meter. The MIU records a time stamp corresponding to when each reading was taken, according to its internal clock. This time stamp may be an absolute time value or a relative time value. An absolute time value may be an actual time of day (e.g., 1:12:03 PM) or simply the value of a serialized counter that increments in units derived from the internal clock circuit of the MIU. A relative time value may be an indicator of the elapsed time since some defined event has occurred, such as the time the preceding reading was taken. Such relative time values may be expressed in units of real time (hours, minutes, seconds) or as a number of increments of a counter derived from the internal clock circuit of the MIU. The MIU also transmits one or more of these meter readings in a data packet to a collector, in a manner well understood in the art, either on a predetermined interval (which may be a pseudorandom interval) or, in some embodiments where the MIU is capable of two-way communications with the collector, in response to a command to report information from the collector. Upon transmission, the MIU includes an indicator of the elapsed time since each reading. The elapsed time indicator may take many forms, including an absolute or relative time value associated with each reading in the packet, or an absolute or relative time value associated with one reading in the packet from which the time values of the remaining readings in the packet can be derived, based upon the fixed reading intervals at which the readings were made.

In one embodiment, meter readings are made upon fixed reading intervals, according to the internal clock of the MIU. Each data packet transmitted by the MIU includes three readings, an indicator of the elapsed time since the earliest (oldest) reading in the packet was taken, and an indicator of the reading interval at which each reading was taken. In a typical prior art system, the packet would contain the three most recent readings, such that if readings were made once per hour, the packet would contain the most current reading and the readings for the two preceding hours. If readings were made every fifteen minutes, the packet would include the current reading and the readings made over the preceding thirty-minute time period. In order to prevent readings from being lost because of a temporary obstruction that interferes with the transmission or receipt of meter readings, a packet according to this embodiment of the present invention preferably includes the most recent reading and at least one prior reading that is nonsequential with the most recent reading and where there are a multiplicity of reading intervals between these two readings.

Figure 2:
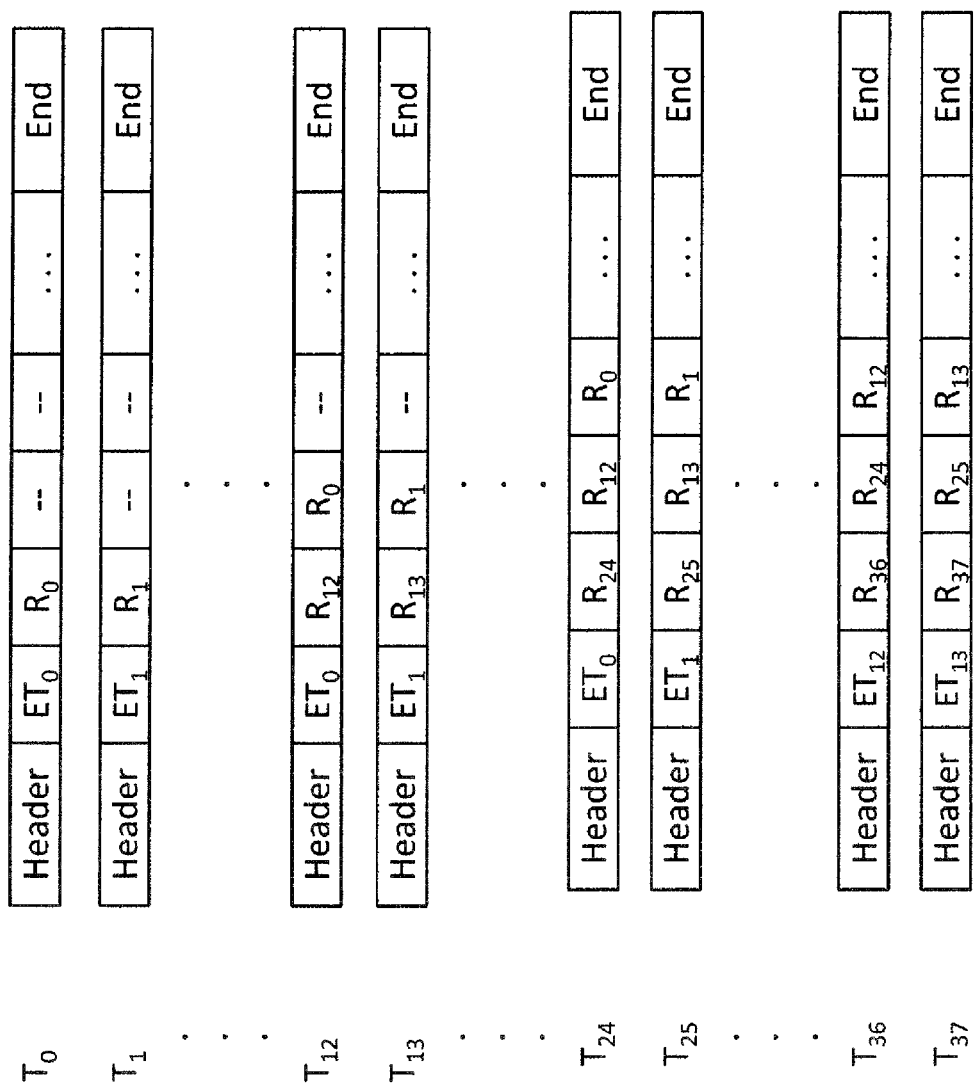
FIG. 2 illustrates exemplary data packets containing meter readings taken and transmitted over a defined time period.

An exemplary embodiment of a data packet is illustrated in FIG. 2. FIG. 2 shows the contents of the data packets containing readings made at reading intervals $T_0$, $T_1$, and on through $T_{37}$. Each data packet contains a header and end of packet indicator, as known in the art. In addition, data packets typically contain error correction information, and may also contain packet type information, commands, and "housekeeping" information. Those types of information are not material to the present application and are simply indicated by an ellipsis in each data packet. As shown in FIG. 2, if the reading interval were once per hour and one desired a twelve-hour gap between readings in the packet, starting at time zero $T_0$, that is, with the very first reading made by the MIU, the packet would contain the most recent reading $R_0$, and the remaining data fields in the packet would contain null values because there is not yet a reading taken twelve hours before. The packet also includes an indicator of elapsed time $ET_0$ since this reading $R_0$ was taken. If the transmission interval were every fifteen minutes, this packet containing the reading $R_0$ would be transmitted three times before a new reading $R_1$ is taken. After $R_1$ is taken at interval $T_1$, the packet contains the most recent reading $R_1$, the elapsed time $ET_1$ since $R_1$ was taken, and the remaining data fields in the packet would contain null values because there is not yet a reading taken twelve hours before. This process is repeated until, in this example, twelve hours has elapsed. After twelve hours has elapsed, the most recent reading $R_{12}$ is taken at interval $T_{12}$, and the MIU's memory now contains a reading twelve hours old, namely $R_0$. The elapsed time indicator $ET_0$ indicates how much time has elapsed since $R_0$ was taken to the transmission of the packet. The elapsed time since the $R_{12}$ reading was taken is therefore $ET_0$ less twelve reading intervals. (Of course, this process could be altered by basing the elapsed time indicator on the most recent reading and calculating the elapsed time of the earlier readings based the number of elapsed reading intervals.) Similarly, an hour later at $T_{13}$, the most recent reading $R_{13}$ is transmitted along with $R_1$ and $ET_1$. If the packet contained three readings, according to this embodiment, where the transmitted readings are twelve hours apart, the third value is still blank, until the twenty-fourth reading is made. At the twenty-fourth hour $T_{24}$, the next packet transmitted includes readings $R_{24}$, $R_{12}$, and $R_0$, as well as an elapsed time indicator. Following the twenty-fifth reading at interval $T_{25}$, the transmitted packet contains readings $R_{25}$, $R_{13}$, and $R_1$, and an elapsed time indicator for $R_1$. This process continues as readings are made and transmitted. In each case, the packet would include the elapsed time from the time the MIU recorded that the earliest (oldest) reading was made and the time of transmission of the packet. Then, once a newer reading was made, the packet includes this newer reading, the reading taken twelve hours before, and the reading taken twenty four hours before the most recent reading. In this embodiment, if there were an obstruction preventing successful transmission or receipt of a packet, the obstruction would have to last more than twenty-four hours for data to be lost. Further, even though each reading is transmitted only every twelve hours, it is still transmitted three times before it progresses through the available data fields in the packet and rolls off.

As noted, in the embodiment described above, the elapsed time indicator referenced the time elapsed since the earliest (oldest) reading in the packet was made, and the elapsed times for the remaining packets were computed based on this elapsed time indicator and the number of reading intervals between the reported readings in the packet. Other embodiments may utilize the time elapsed since the most recent reading and the number of reading intervals as a basis for computation, or may utilize alternative forms of elapsed time indicators, such as an absolute or relative time value associated with each reading in the packet.

The interval at which meter readings are made is independent of the interval at which data packets containing the readings are transmitted. In some embodiments, there may be multiple transmissions between every reading. For example, the MIU may read the meter once per hour and transmit a packet containing selected readings every ten minutes. In other embodiments, there may be multiple readings between transmissions. For example, the MIU may read the meter once per hour and transmit a large packet of data with many meter readings every twelve hours or twenty four hours. The principles of the present invention in which the data packet contains at least two nonsequential readings separated by a multiplicity of reading intervals can be implemented in any configuration of reading and transmission intervals. In a preferred embodiment, the transmission interval is pseudo random to minimize collisions of data during transmission.

A utility or systems operator is often interested in the current flow rate at a meter. Some meters may actually report a flow rate, not merely a reading of the volume that has passed through the meter. Most meters, however, report only a simple meter reading, and average flow rates must be calculated by analyzing volume through the meter over a given time period. In a preferred embodiment, the MIU reports in its data packet the two most recent meter readings, in addition to at least two nonsequential readings, as described above. In this way, this embodiment of the present invention provides information from which the most current flow can be computed, as well as protecting against data loss when transmission or receipt of the data packets is temporarily compromised. Moreover, a data packet containing both the two most recent readings, as well as nonsequential readings separated by an extended time period, allows computation of a current average flow rate and an average flow rate over extended period, from the same data packet. For example, if meter readings were made every fifteen minutes, and the packet contained the two most recent readings, as well as readings made twelve hours and twenty-four hours before the most recent reading, then the average flow rates over the fifteen-minute period, the twelve-hour period, and the twenty-four hour period preceding the most recent reading could be calculated from the same packet.

In all such readings, however, it is desirable to know that accurate times of the meter readings are being reported. As described above, the data packets include an elapsed time indicator from which the time each meter reading in the packet was made can be determined. However, if the clock of the MIU is inaccurate, whether fast or slow, then the MIU's time stamp for each reading and the elapsed time reported for each reading also will be inaccurate. One aspect of the present invention is to quantify the extent of any inaccuracy in the MIU clock. As described in the background section above, the clock in a collector or other intermediate device receiving transmissions from an MIU is typically much more accurate than the internal clock of the MIU. The clock in the collector may, for example, be set by using a GPS signal. Adding a GPS receiver to an MIU would not likely be cost effective but including a GPS receiver in a collector may be worthwhile given the relatively smaller number of collectors used (in a multi-tiered architecture). In one embodiment, quantifying the inaccuracy of the MIU clock is done by comparing the elapsed time reported by the MIU for the same reading over successive transmissions with the actual time elapsed for the reading, based on the clock in the receiving device. The term "same reading" is used to refer to successive packets containing retransmission of the same actual reading made at a specific time, such as the reading made at 12:00 PM on January 1. That same reading will be transmitted multiple times after it is made; the number of times and interval between transmission depends upon the configuration of the system. This aspect of the invention can be applied even when a reading is reported sequentially, on in successive packets, or nonsequentially when the time between reports is rather small.

In one embodiment, the elapsed time for a specific meter reading $R_0$ is reported by an MIU at time 0, which shall be referred to as reported elapsed time (RET) $RET_{R0-0}$. When that packet is received, since it is the first time that reading is received, the collector records the elapsed time reported and actual elapsed time (AET) $AET_{R0-0}$ as the same value. (In practice, the collector may have already determined the amount by which the reported elapsed time should be adjusted from prior analysis, as described below). Some time later, the same reading $R_0$ is again included in a packet and an updated reported elapsed time is reported (or can be computed) based on the elapsed time indicator in the packet. In a preferred embodiment, the $R_0$ reading is included in packets transmitted twelve hours (with reported elapsed time $RET_{R0-12}$) and twenty-four hours (with reported elapsed time $RET_{R0-24}$) after its initial transmission. Upon each successive receipt of the same reading $R_0$, the actual elapsed time is recorded, which in this example would be denoted $AET_{R0-12}$ and $AET_{R0-24}$. The reported elapsed time RET is compared to corresponding actual elapsed time AET to determine how much the MIU's clock varies from the correct time.

In a preferred embodiment, this process is repeated each time the same reading is received successively, and is repeated for substantially all received readings. The data is recorded and analyzed and the variability of the MIU clock is determined. Further, the rate of change of the variability or drift of the MIU clock may be determined from analysis of readings over an extended period of time. For example, when comparing the elapsed time for same reading as reported over a twenty-four hour period, the MIU clock may have a one-percent error. But one month later, the variability over a twenty-four hour period may be 1.5%, and then one month later, 2.0%. This data indicates that the accuracy of the MIU clock is decreasing steadily by about 0.5% per month. This could be due to temperature variations or a component that is not keeping time properly. Analysis of the data over a longer time period might allow identification of the root cause of the problem.

In another embodiment, inaccuracies of the MIU clock that exceed a certain threshold are reported to a central server or system. This may trigger a visit by a field technician to replace an MIU or lead to discovery of a manufacturing defect causing such variability. Such a threshold could be based upon a fixed differential between reported and actual elapsed time (such as a one-hour variance over a twenty-four hour period) or upon an acceleration in the variance of the MIU clock versus actual time (such as the inaccuracy of the MIU clock progressively increasing by 0.1% per week). Data related to environmental conditions, such as temperature, precipitation, humidity, barometric pressure, and the like, for the geographic area in which the subject MIU is located may be acquired. By comparing MIU accuracy to these data, the effect, if any, of various environmental conditions on MIU accuracy may be measured.

Some AMR systems utilize two-way communications between the MIU and the collecting devices. In one embodiment of the present invention implemented in such systems, once the error in the MIU clock has been quantified, a command may be issued to the MIU to reset its clock to the correct time to correct the error. If a rate of change of the variability has been measured, then a calibration factor may be sent to the MIU, which is used by the internal software of the MIU to compensate for the error and adjust the MIU clock or reported readings of the clock accordingly to improve its timekeeping functions.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

What is claimed is:

1. A method of reporting information from a meter in an automated meter reading system, comprising:
   (a) reading the meter upon a series of reading intervals and associating each reading with a time stamp corresponding to when said reading was made;
   (b) transmitting a packet comprising first and second non-sequential readings and a third reading from said series, and an indicator of time elapsed since each said reading was taken, wherein said packet does not include a reading from said series between said non-sequential readings, and wherein the interval between the third reading and the closest of the first or second readings is not equal to the interval between the first and second readings; and
   (c) subsequently transmitting a packet comprising a reading more recent than either of said non-sequential readings and another reading from said series between said first and second non-sequential readings.

2. The method of claim 1 wherein said packets are transmitted on a transmit interval, and there is at least one transmit interval in each reading interval.

3. The method of claim 1 wherein said packets are transmitted on a transmit interval, and there is at least one reading interval in each transmit interval.

4. The method of claim 1, wherein said time stamp corresponds to an actual time of day and said indicator comprises said time stamp.

5. The method of claim 1, wherein said indicator comprises the difference between the time of transmission of said packet and said time stamp.

6. The method of claim 5, wherein said time stamp corresponds to a serialized time value.

7. The method of claim 5 wherein each reading in said packet is associated with the actual time of day corresponding said indicator by a device receiving said transmission.

8. The method of claim 1, wherein the reading intervals are fixed and said time stamp corresponds to a particular reading interval.

9. The method of claim 2, wherein said reading interval is fifteen minutes, and the elapsed time since said two readings were made are approximately 12 hours and approximately 24 hours, respectively.

10. The method of claim 1, wherein said packet comprises at least three readings, which comprise the two most recent sequential readings from said series.

11. The method of claim 1, wherein said series comprises a plurality of readings between said two non-sequential readings reported in said packet in step (b).

12. The method of claim 11, wherein said packet does not contain any of said plurality of readings.

13. The method of claim 1, further comprising repeating steps (b) and (c) until all readings from said series between said first and second non-sequential readings have been transmitted.

* * * * *